(12) United States Patent
Medwick et al.

(10) Patent No.: US 6,849,328 B1
(45) Date of Patent: Feb. 1, 2005

(54) LIGHT-TRANSMITTING AND/OR COATED ARTICLE WITH REMOVABLE PROTECTIVE COATING AND METHODS OF MAKING THE SAME

(75) Inventors: Paul A. Medwick, Monroeville, PA (US); Erin Goodreau, Pittsburgh, PA (US); Ernest L. Lawton, Clemmons, NC (US); James J. Finley, Pittsburgh, PA (US); George M. Martin, Freeport, PA (US); James P. Thiel, Pittsburgh, PA (US); Gary J. Marietti, Cheswick, PA (US); Roger L. Scriven, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/567,934

(22) Filed: May 10, 2000

Related U.S. Application Data
(60) Provisional application No. 60/142,090, filed on Jul. 2, 1999.

(51) Int. Cl.⁷ .............................................. B32B 17/10
(52) U.S. Cl. ....................... 428/341; 428/412; 428/432; 428/433; 428/442; 428/458; 428/461; 428/463; 428/464
(58) Field of Search ................................. 428/341, 412, 428/432, 433, 442, 458, 461, 463, 464; 427/154, 156, 155

(56) References Cited

U.S. PATENT DOCUMENTS

| | | | |
|---|---|---|---|
| 3,652,246 A | 3/1972 | Michelotti et al. | 65/181 |
| 4,149,929 A | 4/1979 | Ladany | 156/668 |
| 4,351,861 A | 9/1982 | Henery | 427/255.1 |
| 4,504,109 A | 3/1985 | Taga et al. | 350/1.6 |
| 4,512,473 A | 4/1985 | Thomaswick et al. | 206/454 |
| 4,517,242 A | 5/1985 | Sinha et al. | 428/336 |
| 4,610,771 A | 9/1986 | Gillery | 204/192.1 |
| 4,612,058 A | 9/1986 | Geke et al. | 134/38 |

(List continued on next page.)

FOREIGN PATENT DOCUMENTS

| | | |
|---|---|---|
| FR | 2295100 | 7/1976 |
| FR | 2 543 514 | 10/1984 |
| GB | 2 145 640 | 4/1985 |
| GB | 2 209 292 | 5/1989 |
| GB | 2302102 | 1/1997 |
| JP | 7567845 | 6/1975 |
| WO | 98/58885 | 12/1998 |

*Primary Examiner*—D. S. Nakarani
(74) *Attorney, Agent, or Firm*—Jacques B. Miles

(57) ABSTRACT

A method and coating are provided for temporarily protecting a substrate or article during shipping, handling or storage by applying a removable protective coating over at least a portion of the substrate. The substrate may be flat or curved and may have zero, one or more functional coatings. A plurality of substrates with the protective coating of the invention may be arranged in a shipping container so that the protective coating reduces the possibility of damage to the substrate or optional functional coating. In one embodiment, the protective coating is the evaporation or reaction product of an aqueous coating composition containing a polyvinyl alcohol polymer which may be subsequently removed by aqueous washing, thermal decomposition or combustion. In another embodiment, the protective coating is formed by sputtering a substantially carbon coating onto the substrate. The carbon coating is subsequently removed by combustion. The protective coating may have identification materials, such as colorants or fragrance materials, such that different types of substrates and/or functional coatings can be distinguished from each other. Additionally, the temporary protective coating can improve the heating of a functionally coated glass substrate.

25 Claims, 2 Drawing Sheets

U.S. PATENT DOCUMENTS

| | | | |
|---|---|---|---|
| 4,710,426 A | 12/1987 | Stephens | 428/336 |
| 4,716,086 A | 12/1987 | Gillery et al. | 428/630 |
| 4,719,126 A | 1/1988 | Henery | 427/165 |
| 4,746,347 A | 5/1988 | Sensi | 65/94 |
| 4,792,536 A | 12/1988 | Pecoraro et al. | 501/70 |
| 4,806,220 A | 2/1989 | Finley | 204/192.27 |
| 4,834,857 A | 5/1989 | Gillery | 204/192.27 |
| 4,853,257 A | 8/1989 | Henery | 427/166 |
| 4,898,789 A | 2/1990 | Finley | 428/623 |
| 4,898,790 A | 2/1990 | Finley | 428/623 |
| 4,902,580 A | 2/1990 | Gillery | 428/623 |
| 4,948,677 A | 8/1990 | Gillery | 428/623 |
| 4,952,423 A | 8/1990 | Hirata et al. | 427/109 |
| 5,026,597 A | 6/1991 | Franz et al. | 428/323 |
| 5,028,759 A | 7/1991 | Finley | 219/203 |
| 5,059,295 A | 10/1991 | Finley | 204/192.27 |
| 5,110,336 A | 5/1992 | Kadunce et al. | 65/24 |
| 5,240,886 A | 8/1993 | Gulotta et al. | 501/70 |
| 5,330,232 A | 7/1994 | Smith | 283/81 |
| 5,356,718 A | 10/1994 | Athey et al. | 428/428 |
| 5,385,872 A | 1/1995 | Gulotta et al. | 501/71 |
| 5,393,593 A | 2/1995 | Gulotta et al. | 428/220 |
| 5,552,180 A | 9/1996 | Finley et al. | 427/165 |
| 5,593,926 A | 1/1997 | Fujihira | 437/209 |
| 5,618,582 A | 4/1997 | VanWinckel | 427/259 |
| 5,653,903 A | 8/1997 | Pinchok, Jr. et al. | 219/203 |
| 5,688,864 A | 11/1997 | Goodwin | 524/858 |
| 5,776,236 A | 7/1998 | Neuman et al. | 106/287.17 |
| 5,821,001 A | 10/1998 | Arbab et al. | 428/623 |
| 5,830,252 A | 11/1998 | Finley et al. | 65/60.5 |
| 5,860,539 A | 1/1999 | Brown | 211/183 |
| 6,027,766 A | 2/2000 | Greenberg et al. | 427/226 |
| 6,124,044 A * | 9/2000 | Swidler | 428/500 |
| 6,233,972 B1 * | 5/2001 | Foster et al. | 65/60.3 |
| 6,238,781 B1 * | 5/2001 | Anderson et al. | 428/216 |

\* cited by examiner

LIGHT-TRANSMITTING AND/OR COATED ARTICLE WITH REMOVABLE PROTECTIVE COATING AND METHODS OF MAKING THE SAME

CROSS-REFERENCE TO RELATED APPLICATION

This application claims the benefits of U.S. Provisional Application No. 60/142,090, filed Jul. 2, 1999, entitled "Film-Containing Substrate with Protective Layer and Methods", which is herein incorporated by reference.

FIELD OF THE INVENTION

The present invention relates generally to temporary or removable protective coatings for substrates with and without any functional coatings and, more particularly, to removable protective coatings to reduce the susceptibility of substrates, like glass substrates having one or more functional coatings, to mechanical damage during processing, handling, shipping or storage.

TECHNICAL CONSIDERATIONS

Some sheet or panel shaped substrates, whether flat or curved, can have two major surfaces terminating in a peripheral edge, e.g., glass or certain plastic sheets, where at least one surface has visible light transmittance that ranges from greater than 0% to less than 100%. These types of substrates can have a functional coating deposited on one or more surfaces. For some substrates, such as mirrors, one surface of the substrate may be light transmitting, e.g., visible light transmitting, and the other surface visible light reflecting. These types of substrates can be further fabricated into other articles or products.

For instance, in the glass industry, large glass pieces, e.g., generally greater than about 4 feet (1.2 m)×6 feet (1.8 m), are prepared by glass manufacturers and then shipped to fabricators to be cut into smaller pieces and incorporated into various production articles, such as architectural windows, automotive transparencies, insulated glass (IG) units, mirrors, and the like, which production articles are then shipped by the fabricator to customers. As used herein, such large substrate pieces which are further processed or cut for incorporation into smaller production articles are referred to as "manufacture substrates". The manufacture substrates may or may not include one or more functional coatings, such as solar control, conductive, antireflective and/or low emissivity coatings. Also, glass and plastic light-transmitting substrates may have one or more functional coatings that modify various physical properties, e.g., optical, thermal or mechanical properties, of the coated glass or plastic or its surface(s). In addition to plastic and glass large manufacture substrates having zero, one, or more than one functional coating, functionally coated glass pieces of any size may be shipped to a fabricator by a manufacturer.

These substrates are typically purchased and shipped in bulk, with several pieces shipped together to the fabricator. The substrate pieces may be bundled together and shipped on a wooden pallet in conventional manner well known in the glass shipping art. In addition to wooden pallets, specialized shipping containers are known. For example, U.S. Pat. Nos. 4,512,473 and 5,860,539 disclose shipping containers for transporting a plurality of sheets. These known shipping methods are quite adequate for shipping substrates without functional coatings or substrates of substantially uniform size. However, when shipping substrates with functional coatings or substrates of different sizes, a high spot or corner of one substrate may contact the surface, e.g., the functionally coated surface, of the adjacent substrate during handling, processing, shipping or storage and might damage the functional coating or scratch the adjacent substrate surface.

In some industries, protective coatings have been used in order to reduce shipping damage. For example, French reference FR 2,295,100 describes a peelable protective coating for surfaces of metals, glass and plastic. Such a peelable coating is formed from a liquid composition of 5 to 40 percent soluble copolyamide, 55 to 85 percent ethanol and 0 to 20 percent water. However, the disadvantages of such peelable coatings with a large amount of organic solvent are threefold. A large amount of organic solvent must be reclaimed, recycled, or disposed of after being used in the deposition of the peelable protective coating. Also, the solid peeled film must be properly disposed of. Further, considerable time is required to peel the coating completely off of the substrate surface. For hastily removed peelable coatings, small patches of the peelable coating may remain on the substrate, requiring increased time and labor costs to inspect and remove these small patches. Additionally, some organic solvents may be flammable.

Other types of temporary protective coatings used in id various industries are typically formed from polymers or waxes applied and, after shipping, removed with polar and/or non-polar solvents, e.g., organic and/or inorganic solvents, such as acidic or alkaline solvents, hydrocarbons or lower monohydric alcohols. For example, see JP 7567845 where alkaline inorganic cleaning solvents remove a polymeric shipping coating. Such an approach still has the drawback of the need for disposal of corrosive or caustic solvents and/or inorganic salts, which requires that the accumulating wastewater be treated or neutralized. Further, alkaline or acidic solvents may be incompatible with certain substrates or any functional coatings present on the surface of those substrates. Additionally, for plastic substrates, certain organic solvents may discolor, stain, oxidize or swell the substrate or make the substrate more brittle.

U.S. Pat. No. 4,315,957 (equivalent to German Application No. 2926197) discloses the removal of a wax-based protective coating using a mixture of water and steam at a temperature of 90° C.–95° C. The steam removal process is energy intensive and poses the risk of scalding by the hot water/steam mixture.

U.S. Pat. No. 5,026,597 discloses a temporary protective coating formed from a water soluble film-forming polymer and insoluble spacer particles, such as polyethylene or acrylic beads. The spacer particles become integrated into the structure of the dried coating. No coating thicknesses are given and no mention is made of incorporating identification materials, such as colorants, into the coating.

Therefore, it would be advantageous to provide a method of forming a removable protective coating over a substrate with or without one or more functional coatings, particularly a substrate with some visible light-transmitting characteristics like glass, which reduces or eliminates at least some of the drawbacks discussed above.

SUMMARY OF THE INVENTION

An article of the invention includes a substrate, preferably a substrate having at least one light-transmitting surface, with a removable protective coating deposited over at least a portion of the surface. The substrate may be coated with one or more functional coatings of various types. The removable protective coating is deposited over the substrate surface where protection is desired. This protection can be from mechanical, chemical or handling damage and/or from misidentification. For large size or "manufacture" light-transmitting substrates on the order of greater than about 4 feet (1.2 m) by about 6 feet (1.8 m), the protective coating is preferably deposited over most, preferably all, of the exposed substrate that might not be protected by some form of packaging, such as corners, frames, or edge guards. For substrates with at least two major surfaces, one or more of the surfaces (e.g., a first surface) can be coated with the protective coating. For substrates with one or more functional coatings, (e.g., a functional coating on the first surface) the protective coating is preferably deposited over at least a portion of the functional coating(s) to protect the functional coating(s) from mechanical and/or chemical damage and/or misidentification during shipment, storage, handling, and processing. The functional coating may be a single layer or a multiple layer coating, and may include one or more metals, non-metals, semi-metals, semiconductors, or alloys, compounds, composites, combinations, or blends thereof.

In one aspect of the invention, the protective coating results from the evaporation or reaction product of a polymeric coating composition, e.g., a liquid solution, emulsion, suspension, slurry, or dispersion, deposited over the substrate. For substrates without functional coatings or with just a single layer metal oxide coating, the coating composition may be essentially free of spacer material. The protective coating can be subsequently removed by washing with an appropriate solvent or by combustion or thermal decomposition.

In another aspect of the invention, the protective coating is a substantially carbon coating applied over the substrate, for example by conventional chemical or vapor deposition techniques or methods. This substantially carbon protective coating may be subsequently removed by combustion.

Another aspect of the invention includes a method of identifying selected substrates. The method includes forming a removable protective coating of a different selected color, texture, pattern, appearance, scent or otherwise discernible identifying property on different substrates to distinguish the different substrates from each other. The removable protective coating may be formed by applying a coating composition e.g., solution, emulsion, suspension, slurry or dispersion, over at least a portion of the substrate. The coating composition may then be cured or dried, to form a protective coating of a selected or desired appearance, color or scent over the substrate. The protective coating may subsequently be removed by an appropriate solvent or by combustion or thermal decomposition.

In a further aspect of the invention, a coated article is provided which includes a flat glass substrate having a first surface and a removable protective coating deposited over at least a portion of the first surface. The protective coating has a thickness of less than about 50 microns and is deposited from a coating composition that is essentially free of spacer material.

An additional aspect of the invention is a method of preparing a shipping container of flat or curved sheets, each having a first surface. A removable protective coating is applied over at least a portion of the first surface of at least a portion of the substrates. The substrates are arranged in the shipping container such that at least one protective coating is located between at least one pair of adjacent substrates.

Another aspect of the invention is a method of fabricating an article which includes receiving a shipping container, the shipping container having a plurality of substrates, with each substrate having a first surface with a removable protective coating located on the first surface of at least a portion of the substrates and with the substrates positioned such that at least one protective coating is located between at least one adjacent pair of substrates. The protective coating is then removed from at least one of the substrates, e.g., by washing, combustion, or thermal decomposition. The substrate can be processed, e.g., cut, trimmed, bent, shaped, and/or incorporated into a production article, before or after removal of the protective coating. Another removable protective coating, which may be the same or different from that discussed above, can be applied to at least a portion of the production article before shipping or handling the production article.

A still further aspect of the invention is a method of promoting uniform heating, e.g., tempering, bending, shaping, or heat-strengthening, of a substrate having a functional coating, such as a low emissivity or solar control coating. The method includes applying a removable, high emissivity coating over at least a portion of the functionally coated substrate before heating. The high emissivity coating provides increased heat absorption compared to the functional coating and, hence, decreases the time required to heat the substrate to a desired treatment temperature. The high emissivity coating is configured to combust or thermally decompose during the heating process.

DESCRIPTION OF THE INVENTION

Unless otherwise indicated, all numbers expressing quantities of ingredients, reaction conditions, and so forth used in the specification and claims are to be understood as being modified in all instances by the term "about". Also, as used herein, the term "polymer" is meant to refer to oligomers and both homopolymers and copolymers. Additionally, any numeric reference to amounts, unless otherwise specified, is "by weight"; for instance, the phrase "solids of 34%" means "solids of 34% by weight". The following references discussed below are herein incorporated by reference: U.S. Pat. Nos. 4,746,347; 4,792,536; 5,240,886; 5,385,872; 5,393,593; 5,653,903; 5,028,759; 4,898,789; 5,821,001; 4,716,086; 4,610,771; 4,902,580; 4,716,086; 4,806,220; 4,898,790; 4,834,857; 4,948,677; 5,059,295; 5,028,759; 3,652,246; 4,351,861; 4,719,126; 4,853,257; 5,356,718; 5,776,236; 5,028,759; 4,898,789; 4,948,677; 4,898,790; 4,806,220; 4,952,423; 4,504,109; U.S. patent application Ser. No. 09/058,440; and British reference GB 2,302,102.

Figure 1:
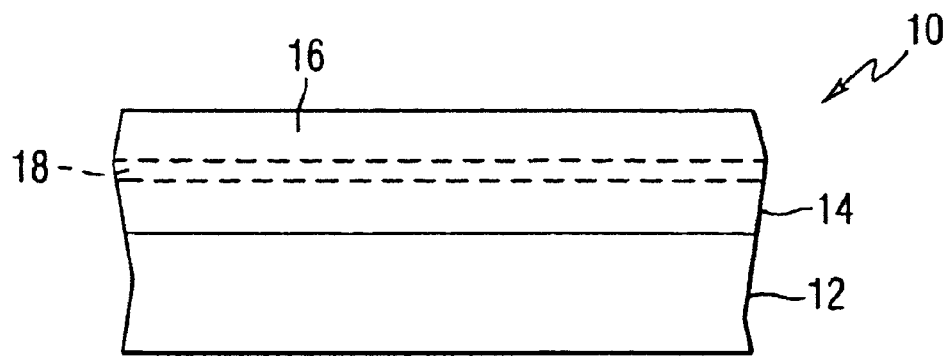
FIG. 1 is a cross-sectional view, not to scale, of a coated glass article incorporating a removable protective coating of the invention.

A coated article having a temporary protective coating of the invention is generally designated 10 in FIG. 1. The coated article 10 includes a substrate 12 which may be of any material, such as metal, but in the preferred practice of the invention is preferably a material having at least one light transmitting surface, such as but not limited to plastics, such as polyacrylates, polycarbonates, and polyethyleneterephthalate (PET), ceramic or, most preferably, glass or mixtures or combinations thereof. The glass can be, for example, conventional untinted soda lime silicate glass, i.e. "clear glass", or can be tinted or otherwise colored glass, borosilicate glass, leaded glass, tempered, untempered, annealed, or heat strengthened glass. The glass may be of any type, such as conventional float glass or flat glass, and may be of any composition having any optical properties, e.g., any value of visible transmission, ultraviolet transmission, infrared transmission, and/or total solar energy transmission. Types of glass suitable for the practice of the invention are described, for example but not to be considered as limiting, in U.S. Pat. Nos. 4,746,347; 4,792,536; 5,240,886; 5,385,872; and 5,393,593. The glass substrate may be of any dimensions but, in a currently preferred practice for glass substrates without any functional coatings, the uncoated glass substrate 12 is preferably flat glass, and most preferably flat glass that is larger than about 4 feet (1.2 m) by 5 feet (1.5 m). The glass substrate 12 may be of any thickness but preferably has a thickness of about 1 mm to about 50 mm, more preferably about 2 mm to about 13 mm, and still more preferably about 2 mm to about 6 mm. The shape of the glass is preferably a panel having a first surface and opposing second major surface where both surfaces terminate in a peripheral edge. It will be appreciated by one of ordinary skill in the art that the substrate could be of any type, e.g., rigid, flexible, or even a self-supporting film or web, as long as the substrate is capable of being coated with the removable protective coating of the invention as described below. For example, the substrate 12 can be a conventional spandrel as in the commercial glass marketplace. The substrate 12 may also be of any shape, such as curved, round, or flat.

One or more optional functional coatings 14 may be deposited over at least a portion of a surface of the substrate 12. For a panel, a functional coating 14 may be deposited over the majority of one or both surfaces of the substrate 12. As used herein, the term "functional coating" refers to a coating which modifies one or more physical properties of the substrate, e.g., optical, thermal, chemical or mechanical properties, and is not intended to be removed from the substrate 12 during subsequent processing. The functional coating 14 is typically a more permanent or "non-removable" coating in that the functional coating is considered to be intrinsic to, or required for, the end-use application of the functionally coated substrate. The functional coating 14 may have one or more functional coating films of the same or different composition or functionality. As used herein, the terms "layer" or "film" refer to a coating region of a desired or selected coating composition. The film may be homogeneous, non-homogeneous, or have a graded compositional change. A film is "homogeneous" when the outer surface or portion (i.e., the surface or portion farthest from the substrate), the inner surface or portion (i.e., the surface or portion closest to the substrate) and the portion between the outer and inner surfaces have substantially the same composition. A film is "graded" when the film has a substantially increasing fraction of one or more components and a substantially decreasing fraction of one or more other components when moving from the inner surface to the outer surface or vice versa. A film is "non-homogeneous" when the film is other than homogeneous or graded. A "coating" is composed of one or more "films". Also, as used herein, the terms "deposited over" or "provided over" mean deposited or provided above, i.e., at a greater distance from the substrate 12, but not necessarily in surface contact with. For example, a first coating film "deposited over" the substrate does not preclude the presence of one or more other coating films of the same or different composition located between that first coating film and the substrate.

The functional coating 14 may be an electrically conductive coating, such as, for example, an electrically conductive heated window coating as disclosed in U.S. Pat. Nos. 5,653,903 and 5,028,759, or a single-film or multi-film coating capable of functioning as an antenna. Likewise, the functional coating 14 may be a solar control coating, for example, a visible, infrared or ultraviolet energy reflecting or absorbing coating. Examples of suitable solar control coatings are found, for example, in U.S. Pat. Nos. 4,898,789; 5,821,001; 4,716,086; 4,610,771; 4,902,580; 4,716,086; 4,806,220; 4,898,790; 4,834,857; 4,948,677; 5,059,295; and 5,028,759, and also in U.S. patent application Ser. No. 09/058,440. Similarly, the functional coating 14 can be a low emissivity coating. "Low emissivity coatings" allow visible wavelength energy, e.g., about 400 nm to about 780 nm, to be transmitted through the coating but reflect longer-wavelength solar infrared energy and/or thermal infrared energy and are typically intended to improve the thermal insulating properties of architectural glazings. By "low emissivity" is meant emissivity less than about 0.3, preferably less than about 0.2. Examples of low emissivity coatings are found, for example, in U.S. Pat. Nos. 4,952,423 and 4,504,109 and British reference GB 2,302,102. The functional coating 14 may be a single layer or multiple layer coating and may comprise one or more metals, non-metals, semi-metals, semiconductors, and/or alloys, compounds, composites, combinations, or blends thereof. For example, the functional coating 14 may be a single layer metal oxide coating, a multiple layer metal oxide coating, a non-metal oxide coating, or a multiple layer coating.

Examples of suitable functional coatings for use with the invention are commercially available from PPG Industries, Inc. of Pittsburgh, Pa. under the SUNGATE® and SOLARBAN® families of coatings. Such functional coatings typically include one or more anti-reflective coating films comprising dielectric or anti-reflective materials, such as metal oxides or oxides of metal alloys, which are preferably transparent or substantially transparent to visible light. The functional coating 14 may also include infrared reflective films comprising a reflective metal, e.g., a noble metal such as gold, copper or silver, or combinations or alloys thereof, and may further comprise a primer film or barrier film, such as titanium, as is known in the art, located over and/or under the metal reflective layer.

The functional coating 14 may be deposited over the substrate 12 in any conventional manner, such as but not limited to magnetron sputter vapor deposition (MSVD), chemical vapor deposition (CVD), spray pyrolysis (i.e., pyrolytic deposition), atmospheric pressure CVD (APCVD), low-pressure CVD (LPCVD), plasma-enhanced CVD (PEVCD), plasma assisted CVD (PACVD), thermal or electron-beam evaporation, cathodic arc deposition, plasma spray deposition, and wet chemical deposition (e.g., sol-gel, mirror silvering etc.). Note that sputter deposited coatings are sometimes perceived to be less mechanically durable than coatings deposited by spray pyrolysis or CVD-type coating methods. Examples of suitable CVD coating apparatus and methods are found, for example but not to be considered as limiting to the invention, in U.S. Pat. Nos. 3,652,246; 4,351,861; 4,719,126; 4,853,257; 5,356,718; and 5,776,236.

The present invention is particularly useful for protecting MSVD deposited coatings, which are sometimes perceived to be more easily scratched or damaged than pyrolytically deposited coatings. MSVD coating techniques are well known to one of ordinary skill in the glass coating art and, hence, will not be discussed in detail. Examples of suitable MSVD coating methods are found, for example but not to be considered as limiting, in U.S. Pat. Nos. 5,028,759; 4,898,789; 4,948,677; 4,834,857; 4,898,790; and 4,806,220.

A temporary or removable protective film or coating 16 of the invention is provided over at least a portion of the substrate 12. As used herein, the term "removable protective coating" refers to a coating (i.e. one or more films) which may be subsequently removed and is nonabrasive, i.e., does not easily scratch or damage the underlying substrate 12 or optional functional coating 14. If one or more optional functional coatings 14 are present, the removable coating 16 is preferably applied over at least a portion of the optional functional coating 14, i.e., is applied on the same side of the substrate 12 to which the functional coating 14 is applied such that at least a portion of the functional coating 14 is located between the removable protective coating 16 and the substrate 12. A removable coating 16 may also be applied to at least a portion of the other, i.e., non-functionally coated, side of the substrate 12. Alternatively, functional coatings 14 may be applied to both sides of the substrate 12 with a removable protective coating 16 of the invention applied over at least a portion of each functional coating 14.

For substrates 12 which will be incorporated into automotive transparencies, such as windshields, side lights, rear lights, sun roofs, moon roofs, etc., the protective coating 16 is preferably applied over substantially the entire vision area of the substrate 12, i.e., preferably over at least about 50% of the vision area, more preferably over at least about 80%, and most preferably over the entire vision area.

The removable protective coating 16 is removable without damaging the underlying substrate 12 or optional functional coating(s) 14. In a preferred embodiment of the invention, the removable protective coating 16 is removable using a liquid solvent, more preferably is removable by aqueous washing. Although not preferred, the protective coating 16 may also be removable by wiping, spraying or dipping with aqueous or non-aqueous solvents, organic, alkaline, or acidic solvents. Further, although not preferred, the protective coating 16 can be one that is designed to be removed by mechanical peeling of the protective coating 16 off the surface of the substrate and/or optional functional coatings.

In a currently preferred first embodiment, the removable protective coating 16 comprises a water-soluble or water-dispersible film-forming, e.g., polymeric, material comprising one or more homopolymers or copolymers of starches, casein, and related polymers derived from proteins, acrylic polymers, polyacrylamide, polyalkylene oxide polymers such as ethylene oxide, polyvinyl acetate, polyvinyl alcohol, polyvinyl pyrrolidine, styrene/acrylic acid copolymers, ethylene/acrylic acid copolymers, cellulosics and derivatives of cellulose such as, but not limited to, methyl cellulose, hydroxy propyl methyl cellulose, carboxymethylcellulose, ethylcellulose, alkyl hydroxyalkylcellulose, and derivatives, chemical modifications, combinations, blends, alloys and/or mixtures thereof such that the protective coating(s) 16 formed using these coating compositions retain their removability as described above. The coating composition may have any weight percent of film-forming material that provides acceptable deposition parameters. For example, all of the film-forming material can be in solution or a portion may be present as a precipitate.

In a first embodiment, the protective coating 16 is the reaction product or evaporation product of an aqueous coating composition of the invention which comprises one or more of the above polymeric materials. The coating composition comprises a substantially aqueous solution of polyvinyl alcohol polymer having up to about 30 weight percent of polyvinyl alcohol polymer based on the total weight of the coating composition, more preferably up to about 24 weight percent, even more preferably up to about 12 weight percent, and most preferably about 5 weight percent to about 12 weight percent polyvinyl alcohol polymer. As used herein, the term "substantially aqueous" means more than about 10 volume percent water, preferably more than about 15 volume percent water, and most preferably more than about 21 volume percent water.

The polyvinyl alcohol preferably has a degree of hydrolyzation of greater than about 80%, preferably greater than about 85%. For example, the polyvinyl alcohol may be partially hydrolyzed (e.g. 87 to 89 percent hydrolyzed), intermediately hydrolyzed (e.g. 95.5 to 97.5 percent hydrolyzed), fully hydrolyzed (e.g. 98 to 98.8 percent hydrolyzed), or super hydrolyzed (e.g. greater than 99.3 percent hydrolyzed). As a general rule, as the percent hydrolysis increases, the water resistance, tensile strength, solvent resistance and adhesion to hydrophilic surfaces increase. The film-forming polymer preferably has a weight average molecular weight Mw of about 13,000 to about 23,000. As a general rule, as the Mw increases, the viscosity, tensile strength, water-resistance, adhesion strength, and solvent resistance increase.

Suitable polyvinyl alcohol polymers for the practice of the invention are commercially available from Air Products and Chemicals, Inc. of Allentown, Pa., as AIRVOL® 203, and 203S, polyvinyl alcohol powder or AIRVOL 24-203 aqueous polyvinyl alcohol solution (24 weight %) or dilutions thereof. The aqueous coating composition of the invention may further include a low molecular weight alcohol, such as methanol, ethanol, or isopropanol as a co-solvent to water as the carrier. The amount of alcohol co-carrier that can be added to the solution without causing precipitation of the polyvinyl alcohol resin depends upon the molecular weight and percent hydrolysis of the resin as well as the identity of the specific alcohol added. For example, aqueous solutions of certain grades of polyvinyl alcohol are stable up to about 60 or 70 volume percent isopropanol. Preferably, the alcohol co-solvent is present in an amount of no more than about 50 volume percent, more preferably less than about 10 volume percent, and most preferably about 0 volume percent of the coating composition.

The coating composition may also optionally include a surfactant to increase the wetting characteristics of the coating composition when applied to the substrate 12. Suitable surfactants are commercially available from BYK-Chemie of Wallingford, Conn. as BYK-306, 307 or 333 polyether modified polydimethyl polysiloxane. If present, the surfactant may be present in amounts up to about 5 weight percent, preferably in amounts up to about 3 weight percent, and most preferably in amounts up to about 1 weight percent of the coating composition based on the total weight of the coating composition.

The coating composition may also include other additives, such as conventional and/or commercially available, defoamers, leveling agents, surfactants, flow agents, rheology modifiers, waxes, paraffins, animal, vegetable, or mineral oils, emulsifying agents, thickeners, stabilizers, flame-retardants, anti-blocking agents to avoid tack bonding, lubricants, hydrophobic agents, hydrophillic agents, biocides, fungicides, algicides, anti-mildew agents, organic and/or inorganic fillers or extenders, plasticizers, fragrance materials, or cross-linking agents. As described more fully below, the coating composition may also include organic and/or inorganic colorants, dyes, fluorescent dyes, or pigments to provide the resultant removable protective coating 16 with a selected color. For MSVD coatings, particularly coatings containing silver, the biocide may be a substantially halide free biocide to decrease the possibility of halide, e.g., chloride, interaction with the silver. "Substantially halide free" means that the biocide contains less than 5 weight percent halide, more preferably less than 1 weight percent halide, and still more preferably no halide.

In the currently preferred first practice, the coating composition of the invention is applied over one or more surfaces of the substrate 12, with or without a functional coating 14, in any conventional manner, such as by pouring, spraying, dipping, flow coating, curtain coating, brushing, rolling, splashing, misting, drawn-down, squeegee or spin coating.

In a currently preferred practice, if the functional coating is a single layer metal oxide coating, the coating composition is preferably essentially free of spacer material. Essentially free of spacer material means that no particulate solid spacer or interleaving materials, such as insoluble organic or polymeric particles (e.g. acrylic beads, or polyethylene particles), inorganic particles, e.g., colloidal silica, or similar materials are added to the coating composition before application onto the substrate.

In a currently preferred first practice, the coating composition of the invention is spray applied onto one or more of the surface(s), e.g., first and/or second major surfaces, of the substrate 12 having zero, one, or more functional coatings 14. As will be appreciated by one of ordinary skill in the art, the spray area should include a device to exhaust any over-spray material. For example, conventional exhaust technology and a conventional wet scrubber can be used to exhaust and/or capture the over-spray. The coating composition can be applied as part of a conventional float glass process, part of a conventional tempering process, or part of a conventional glass-coating process.

The substrate 12 with the applied coating composition is then cured, e.g., dried, to provide an evaporative film-forming mechanism or a reactive curing film-forming mechanism. This can be in any conventional manner, such as by convective air flow (either ambient temperature or heated air), radiant heat (e.g. quartz lamp, gas-fired radiant heater, electric radiant heater), convective (forced-air) heat, conductive (e.g. heating the spray-coated substrate on a heatable platen or stage), vacuum drying (e.g. pumping solvent out of applied coating composition, or radiation cured (e.g., IR, UV, microwave, or RF radiation cured). The speed with which the coating composition is cured to form one or more protective coatings may be dictated by additional constraints unrelated to the details of the coating chemistry and application technique.

In a currently preferred practice, the substrate 12 with the applied protective coating composition is dried by convective air drying using one or more air knife(s) or slot-shaped air nozzle(s) connected to a blower to provide turbulent, ambient temperature, air at about 1,000 feet per minute (305 m/min) over the applied liquid coating composition to evaporate the aqueous solvent and any co-solvent and leave a dry evaporation product, which evaporation product forms the protective coating 16. Conventional fans may also be used to evaporate the aqueous solvent. In a preferred method of drying a liquid coating composition, such as those applied over a functional coating, the air knife discharge is directed toward the substrate surface having the applied coating composition. By "directed toward" is meant that the air from the air knife is directed from less than about 180° (i.e., parallel with the substrate surface) to greater than about 90° (i.e., normal to the substrate surface) with respect to the substrate surface.

Preferably, the dried evaporation product, such as polyvinyl alcohol, has a mass coverage on the substrate 12 of up to about 100 grams per square foot (about 1000 g/m$^2$), preferably up to about 25 grams per square foot (about 250 g/m$^2$), more preferably up to about 2.5 grams per square foot (about 25 g/m$^2$), even more preferably up to about 1 gram per square foot (about 10 g/m$^2$), still even more preferably up to about 0.2 grams per square foot (about 2 g/m$^2$), and most preferably between 0.1 gram per square foot (about 1 g/m$^2$) and 0.2 gram per square foot (about 2 g/m$^2$).

Assuming a uniform dried protective coating having an average mass density of about 1 gram per cubic centimeter (1 g/cm$^3$), the protective coating can have an average protective coating 16 physical thickness of up to about 1000 micrometers, preferably up to about 250 micrometers, more preferably up to about 25 micrometers, even more preferably up to about 10 micrometers, still even more preferably up to about 2 micrometers, and most preferably between about 1 micrometer and 2 micrometers on the substrate surface. Particularly for flat or curved panel substrates without a functional coating 14, the protective coating 16 can have a thickness of less than about 50 microns. The exact thickness of the protective coating selected for a particular application depends on several factors, such as the morphology of the coating, the degree of protection desired, the type of substrate, the presence or absence of functional coatings, the type of functional coating present, the similarity of film properties of the protective coating 16 to that of polyvinyl alcohol, and the handling and/or use environment of the substrate.

The degree of protection afforded by the protective coating 16 is affected by, among other things, the type of coating material used, the thickness of the applied protective coating 16, and the coating morphology. For example, using conventional surfactants as described above, the resultant protective coating 16 may be of substantially uniform or continuous thickness over the substrate 12. Alternatively, some coating compositions may dry to form non-continuous or "islanded" protective coatings, which can also provide adequate protection against mechanical damage.

The dried or cured removable protective coating 16 may be optionally dusted in conventional manner with conventional spacing or interleaving material, such as polymethyl methacrylate spheres of about 149 micrometers in diameter, organic or inorganic particles, acrylic beads, colloidal silica particles, polyethylene spheres, or wood flour to further help separate adjacent glass substrates 12 during shipping and/or storage. These spacing materials are preferably applied to the dried coating and therefore do not become integrated into the protective coating film. Suitable spacing material is described, for example, in U.S. Pat. No. 5,026,597, herein incorporated by reference.

Figure 2:
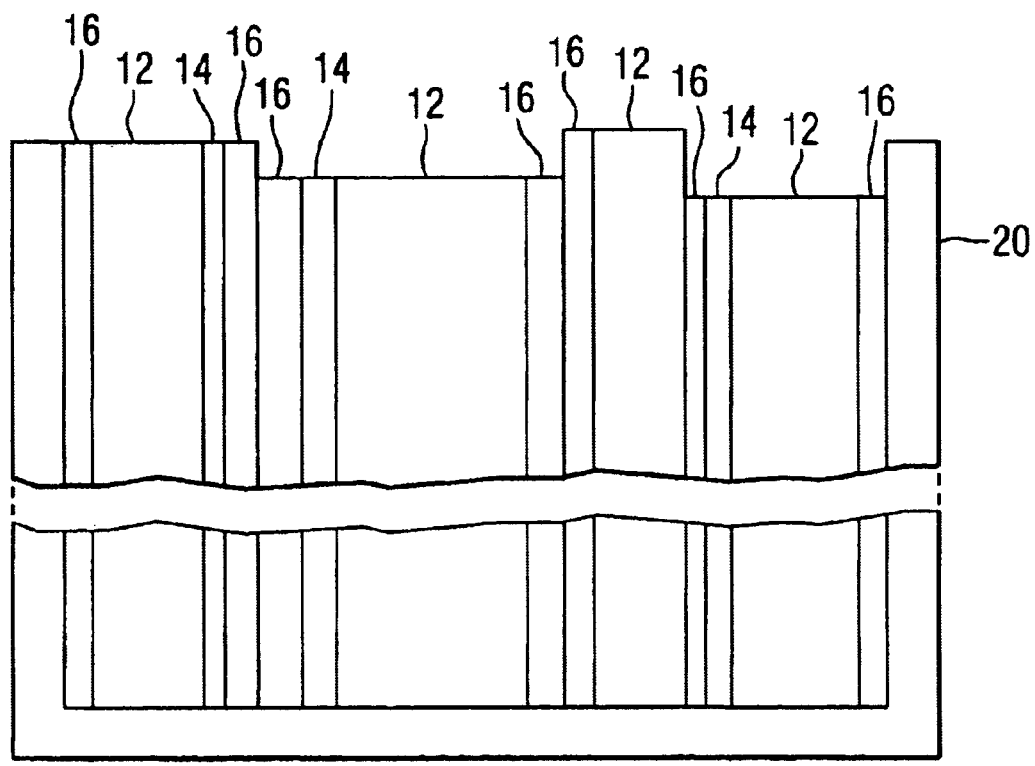
FIG. 2 is an end view, not to scale, of a plurality of glass articles bundled together for shipping and incorporating removable protective coatings of the invention.

One or more substrates 12, such as glass or plastic manufacture substrates, having the removable protective coating 16 of the invention can then be packaged and shipped to a fabricator in conventional manner. A plurality of substrates 12 of any shape or size, e.g., flat glass sheets, incorporating the removable protective coat 16 of the invention can be packaged and shipped together in any conventional manner. For example, FIG. 2 illustrates a conventional packaging or shipping pallet or container 20 containing a plurality of substrates 12 of differing dimensions, e.g., thickness and/or lateral dimensions. The shipping container 20 may be a conventional wooden shipping pallet or any other type of packaging or shipping device used in the shipping or glass arts. The substrates 12 may be of uniform size and shape or may be of varied sizes and shapes. The individual substrates may have zero, one, or more than one functional coating. Further, various combinations of substrates of different sizes with or without functional coatings 14 but separated by a removable protective coating 16 of the invention are possible. The protective coating 16 of the invention may have been dusted with spacing material, such as polymeric spheres as described above. The substrates 12 may have the protective coating 16 of the invention on one or both sides such that at least one protective coating 16 of the invention is located between a pair of adjacent substrates 12. The protective coatings 16 can inhibit or prevent chemical and/or mechanical damage to the surface of the substrates 12 or functional coatings 14.

Upon receipt of the packaged substrates 12, the fabricator may cut and/or score the substrates 12 into desired smaller glass pieces and then break these pieces out before further processing the individual cut pieces. In the case of glass substrates having thicknesses of about 6 millimeters or less, this scoring is typically conducted with a 135° to 140° angle tungsten carbide glass cutting/scoring wheel, which is commonly used in the glass cutting art. If the removable protective coating 16 is too thick, the conventional cutting wheel may not be able to make sharp scores in the larger glass piece, which can adversely impact upon breaking out the smaller glass pieces. The currently preferred mass coverage of about 0.1 to about 0.2 gram per square foot (1.1 to 2.2 g/m$^2$) for a 12 weight percent solution of AIRVOL® 203 polyvinyl alcohol in water has been found to provide adequate protection from mechanical damage during shipping without adversely impacting upon this conventional scoring technique and breakout procedure by the fabricator and, thus, should not have an adverse impact upon the standard cutting practice. For other film-forming materials, the preferred mass coverage may vary depending upon the molecular weight or percent hydrolysis of the material or the weight percent of film-former in the solution.

After the scoring and cutting operation, the protective coating 16 can be removed by the fabricator, e.g., by washing with water. Water at room temperature or at a temperature that is typical of tap water is suitable. The removal of the protective coating 16 does not necessarily require using warm or hot water, although these may also be used to remove the temporary protective coating 16. No special non-aqueous solvents, detergents, surfactants, or high-temperature removal procedures (e.g. steam) should be required although such additives or refinements may be employed to optimize removal of the temporary coating if so desired.

The washed off coating material can be collected and recycled for reuse. For example, if the protective coating 16 is removed by washing, e.g., aqueous washing, the rinse liquid with the removed coating material can be collected, the liquid evaporated, and the dried coating material collected and reused. Alternatively, the rinse liquid with the removed coating material can be precipitated, gelled, or coagulated and the coating material filtered out for reuse. Alternatively still, the rinse liquid with the removed coating material can be gelled or coagulated for reuse in another protective coating operation. Also, the rinse liquid can be evaporated and the coating material collected.

As discussed above, the coating composition of the invention can include one or more colorants (e.g. pigments and/or dyes) such that the protective coating 16 can be selectively colored. Suitable colorants include but are not limited to inorganic colorants such as titanium dioxide, carbon black, chromates of lead, zinc, and barium, cadmium sulfide, iron oxides, Prussian blue, ultramarine, cobalt blue, chromium oxide, red iron oxides, cadmium selenide, red lead, chrome red, and various aluminosilicates and clays; and/or organic colorants such as azo dyes, fluorescent dyes, and phosphorescent dyes. So-called "special effect" pigments may be employed as well, such as but not limited to powders, flakes, or foils of metallic composition or metallically-reflective appearance, colorants having angularly-variable colors or aesthetics, or pearlescent or opalescent pigments.

This coloring of the removable protective coating 16 can be useful to the manufacturer as well as the fabricator to aid in identifying the particular type of substrate, e.g., glass substrate 12, and/or functional coating 14 shipped, stored or received. The manufacturer may utilize different colored removable protective coatings 16 with different types of coated or uncoated substrates 12 to aid the fabricator in quickly and easily identifying the type of glass and/or functional coating received. For example, the manufacturer may apply a red colored removable protective coating 16 only to substrates having a first functional coating 14 and a different, for example, green removable protective coating 16, only to substrates having a second, different functional coating 14. Thus, the fabricator can receive, cut and warehouse the coated glass pieces and then easily identify the type of glass and/or functional coating simply by the color of the removable protective coating 16 applied thereto. This may ease the storage and identification problems of the fabricator since some functional coatings 14, which may be of significantly different functional properties (e.g. optical properties, solar control properties, thermal properties, etc.), are often difficult to distinguish visually. Alternatively, the coating composition may be free of such colorants but still allow for visual distinction of different substrates. For example, the protective coating 16 may be applied in the form of a pattern or the protective coating 16 may change the visual characteristics of the substrate 12 sufficiently to visually distinguish one type of substrate from another. Alternatively, or in addition thereto, the protective coating composition may include a particular or selected fragrance material to impart a selected fragrance to a selected type of substrate such that different substrates could be distinguished by smell. Further, printing ink may be deposited on the protective coating to form words, marks, or other identifying indicia.

Although in the preferred practice discussed above the removable protective coating 16 was washed off the substrate 12 by a room temperature, aqueous rinse, the protective coating 16 could also be removed by combustion or thermal decomposition. For example, after the fabricator scores and breaks out the smaller glass pieces of desired size, depending on the type of glass, the smaller glass pieces may have to be heated in a tempering oven to temper the glass. Typical tempering ovens operate in the range of about 1200° F.–1300° F. (648° C.–704° C.). At these temperatures, the polymeric protective coating 16 discussed above should thermally decompose or burn off the substrate 12. However, this combustion removal procedure is not currently preferred for MSVD functionally coated substrates with the polymeric protective coating 16 of the invention discussed above.

The fabricator can then incorporate the cut substrate piece(s) into a production article, such as automotive transparency, architectural window, IG unit, mirror, LCD display, etc. and then ship the production article to a customer. For example, the cut substrate piece(s) can be incorporated into a conventional window unit having a frame or sash. Prior to shipping the production article to the customer, the fabricator can apply a protective coating 16, which may be the same or different than that described above, over at least a portion of the article, e.g., over the entire window unit including the sash and frame, to protect the production article during shipping to the customer. The customer can then remove the protective coating 16 in similar manner as described above.

In the first embodiment of the removable protective coating 16 of the invention described above, the protective coating 16 was formed as the evaporation or reaction product of an aqueous polymeric coating material. However, an alternative removable protective coating 16 of the invention will now be described. A second embodiment of a removable protective coating 16 of the invention comprises a carbon containing coating or film. The carbon containing coating is preferably substantially carbon, i.e., greater than about 50 weight percent carbon, more preferably greater than about 75 weight percent carbon, still more preferably greater than about 90 weight percent carbon, and most preferably about 100 weight percent carbon based on the total weight of the carbon containing coating. This carbon containing coating can be deposited over the substrate 12 and/or optional functional coating 14 in any conventional manner, such as but not to be considered as limiting, by MSVD or carbon arc deposition. For example, the substrate 12 may be placed in a conventional sputter coating apparatus like an MSVD apparatus and a desired functional coating 14 can be optionally applied in conventional manner. To form a substantially carbon protective coating 16 of the invention, one of the cathode bays in the coater can have a carbon containing or graphite sputtering target, such as is commercially available from MSI, Co. The carbon target can be sputtered in conventional manner to apply a substantially carbon protective coating 16 over the substrate 12 and optional functional coating 14. The carbon containing protective coating preferably has a thickness of greater than 0 Å to about 50 microns, more preferably less than 10 microns, still more preferably less than 3 microns, even more preferably less than 1000 Å, and in a current preferred embodiment is about 300 Å. For MSVD application, the carbon target is preferably sputtered in an atmosphere which is essentially free of oxygen to minimize combustion of the sputtered carbon material. "Essentially free of oxygen" means preferably less than about 20 volume percent oxygen, more preferably less than about 10 volume percent oxygen, and most preferably free of oxygen. A suitable oxygen free atmosphere for sputtering the carbon-containing target comprises argon gas.

Prior to applying the carbon containing removable protective coating 16 of the invention over a substrate 12 with or without a functional coating 14, a blocking layer 18 (shown in dashed lines in FIG. 1) may be applied over the substrate 12, e.g., over the functional coating 14. Applying the carbon containing protective coating 16 directly onto a functional coating 14 may damage the functional coating 14 by chemically reducing the upper portion of the functional coating 14, i.e. drawing oxygen atoms out of the functional coating 14 to form oxides of carbon. Therefore, if a functional coating 14 is present, a blocking layer 18 is preferably applied over the functional coating 14 prior to application of the carbon containing protective coating 16 to prevent the carbon protective coating 16 from pulling oxygen out of the functional coating 14. The blocking layer 18 preferably comprises a material which prevents chemical reduction of the functional coating 14 but does not adversely impact upon the transmission or vision characteristics of the coated article 10. For example, the blocking layer 18 may comprise silicon, titanium, zirconium, niobium, aluminum, or combinations, oxides, nitrides, or oxynitrides thereof. The blocking layer 18 may be applied in any convenient manner, such as those described above for application of the functional coating 14. The blocking layer 18 may have a thickness of greater than 0 Å to about 50 microns, preferably less than 25 microns, more preferably less than 10 microns, still more preferably less than 3.0 microns, even more preferably less than 1.7 microns, and most preferably less than 0.5 microns. In a currently preferred practice, the blocking layer 18 comprises silica having a thickness of 25 Å to 100 Å, preferably 50 Å. The silica blocking layer 18 can be applied in any conventional manner, such as by sputtering a silicon target in an oxygen containing atmosphere to form a silica layer over the functional coating 14 prior to sputtering the carbon target to form the carbon containing protective coating 16. The blocking layer 18 is not limited to use with substrates having functional coatings but can also be applied over non-functionally coated substrates prior to application of the substantially carbon protective coating 16.

After the carbon containing protective coating 16 is applied, the coated article 10 can be shipped to the fabricator and processed as described above. However, unlike the previously discussed polymeric temporary protective coating of the invention, this carbon-containing protective coating would probably not be removable by aqueous washing. Instead, the carbon-containing coating is preferably removed by combustion, e.g., in a tempering oven as discussed above. During tempering, the carbon-containing protective coating 16 would be oxidized and removed from the article 10.

The carbon-containing protective coating 16 of the invention also provides improved tempering characteristics for certain functionally coated substrates. For example, typical solar control or low emissivity functional coatings 14 act as a heat mirror during the tempering process, increasing the time required to temper the coated glass compared to that required to temper uncoated glass. The carbon-containing protective coating 16 of the invention absorbs heat during the tempering process, offsetting some of the heat reflecting effects of the functional coating 14 and decreasing the tempering time from that required for a coated article without such a carbon-containing protective coating 16.

For generally improving the heating, e.g., tempering, characteristics of functionally coated substrates, such as low emissivity or solar control coated substrates, a high emissivity temporary coating, such as but not limited to a substantially carbon coating as described above, can be applied over the functionally coated substrate before heating to help absorb heat and counteract the heat reflecting characteristics of the functional coating. By "high emissivity" is meant emissivity greater than about 0.4, preferably greater than about 0.5, more preferably greater than about 0.6, and even more preferably greater than about 0.8. The high emissivity coating promotes uniform heating over the functionally coated substrate. In addition to tempering, such a high emissivity coating can be used for other operations, such as bending, shaping, or heat-strengthening, to name a few. It will be appreciated by one of ordinary skill in the art that the high emissivity coating is not limited to carbon but could be any coating capable of combustion or thermal decomposition during the selected heating process without adversely impacting upon the substrate and/or functional coating, such as a polymeric coating, for example.

Illustrating the invention are the following examples which, however, are not to be considered as limiting the invention to their details. In Examples 1–10, the glass coupons used for testing the protective coating of the invention were each coated with the same silver based, multi-layer, solar control, MSVD applied coating. The "controls" were pieces of the functionally coated glass without the protective coating of the invention.

EXAMPLE 1

285 ml of deionized (DI) water was heated to a temperature of about 80° C. Using a magnetic stir bar, the water was vigorously stirred while slowly adding 15.0008 g of Airvol® 103 polyvinyl alcohol (PVOH) (Airvol® 103, as well as the other Airvol® materials discussed in the Examples, are commercially available from Air Products and Chemicals, Inc.). The solution was continuously stirred and maintained at a temperature of about 85° C. for about 15 minutes. Then, the heating was stopped but stirring continued while allowing the solution to cool down to room temperature (approximately 20° C.). This procedure resulted in a 5 weight percent ("wt. %") solution of PVOH in DI $H_2O$. Using a polyethylene pipette, a quantity of the PVOH solution was applied as a small puddle to a 4 inch×4 inch (10 cm×10 cm) coupon of glass 2 millimeters thick and having a silver based, multi-layer, solar control, MSVD applied coating. This puddle was then more uniformly distributed over the surface of the sample using a stainless steel drawdown bar at 0.005 inch (5 "mils" or 0.013 cm) wet film thickness. The sample was allowed to dry under a 250 watt heat lamp (commercially available from Sylvania) for about five minutes. After drying, the sample was weighed using a Sartorius mass balance sensitive to 0.0001 g; the uncoated weight of the sample was subtracted from the coated weight; thus the mass of the polymer coating on the 4 inch×4" inch sample was determined to be 0.0714 g. From this result, the expected average mass per square foot of substrate was estimated to be about nine times this number or about 0.64 $g/ft^2$ (7.1 $g/m^2$). The PVOH-coated glass sample was then subjected to a modified Taber abrasion test for 100 cycles with an applied load of 500 grams on each of the two abrasion wheels. The modified Taber test comprises securing the sample to be tested on a flat, circular turntable. Two circular, rotating Calibrase® CS-10F abrasive wheels (commercially available from Taber Industries of N. Tonawanda, N.Y.) are lowered onto the top surface of the sample to be tested; there is a load of 500 grams applied to each abrasive wheel. The Calibras® CS-10F wheels are an elastomeric-type material that is impregnated with an abrasive. To conduct the test, the turntable is switched "ON" and the abrasive wheels turn and abrade the sample's surface as the sample and turntable rotate about a vertical axis until the desired number of rotations or "cycles" is completed. After testing, the sample is removed from the turntable and examined for damage to the top surface. After the Taber test, the PVOH coating was removed by rinsing the sample under cold (room temperature) running DI water. After rinsing, the sample was blown dry with compressed air. In comparison with control samples subjected to the same Taber test, there was significantly less abrasion visible on the PVOH-protected sample. The degree of scratching was determined by measuring the diffuse or "specular-excluded" reflectance, Y, from four compass-point locations around a circle corresponding to the Taber abrasion track using a Spectrogard calorimeter (commercially available from BYK-Gardner) in "specular-excluded" mode (Illuminant D65, 2 degree observer, large aperture specular-excluded reference mode) using the CIE 1931 Y, x, y chromaticity space. A baseline measurement of the "background" specular-excluded reflectance of the sample surface away from the annular Taber abrasion track was taken as well; the baseline reflectance of the undamaged surface was typically measured inside the inner diameter of the abrasion track. Up to about four baseline or "background" measurements were taken and averaged. The average background specular-excluded reflectance of a sample was typically very low, often about Y=0.00, thereby indicating that the diffuse reflectance from the undamaged area of the sample surface was essentially zero as expected for a glass sample that was visibly specular in reflectance away from the abrasion track. The average of the four compass-point measurements of the diffuse reflectance from the Taber abrasion track, less the average baseline specular-excluded background reflectance, is referred to herein as a sample's average "specular-excluded Taber score" or simply "Taber score". In this scheme, a higher Taber score indicates more diffuse reflectance from the abrasion track and therefore is interpreted as indicating a greater degree of damage. The average "Taber score" of the PVOH-protected sample was 0.10; the average Taber score of an unprotected control sample (i.e., a coupon of the functionally coated glass without the protective coating of the invention) subjected to the same abrasion test was 2.85 (see Table 1 below).

EXAMPLE 2

A 5 wt. % solution of Airvol® 203 polyvinyl alcohol (PVOH) was prepared as in Example 1. The solution was then poured into a Sure Shot® Model A® air spray canister, commercially available from Milwaukee Sprayer Manufacturing Company, Inc., and pressurized to approximately 100 psi (7 kg/sq. cm). The PVOH solution was sprayed onto a test coupon of glass measuring approximately 12 inch×12 inch (30.5 cm×30.5 cm) and 2 millimeters thick and having the same functional coating as in Example 1; two passes and a spray tip-to-substrate distance of about 6 inches (15.2 cm) were used. After spraying, the PVOH coating was dried under a heat lamp for about 5 minutes. After the PVOH coating had dried, a tungsten carbide glass cutting hand tool was used to score the test coupon for the purposes of cleaving it into nine 4"×4" (10 cm×10 cm) pieces. The piece cut from the center of the coupon was weighed and then subjected to a modified Taber test for 100 cycles as described in Example 1. After the Taber test, the protective PVOH coating was removed from the sample by rinsing it under ambient-temperature running deionized water and blown dry with compressed air. The sample was then re-weighed and the two mass measurements were subtracted thereby indicating PVOH coating coverage of about 0.1991 g on the 10 cm×10 cm sample. The expected mass per square foot of substrate coated was estimated to be about nine times this number or about 1.8 $g/ft^2$ (20 $g/m^2$). Inspection of the sample after stripping the PVOH coating showed that, in comparison with control samples subjected to the same Taber test, there was significantly less abrasion visible on the PVOH-protected sample. The degree of scratching was determined by measuring the diffuse reflectance from four compass-point locations around a circle corresponding to the Taber abrasion track using a Spectrogard colorimeter in "specular-excluded" mode as described in Example 1 above. The average Taber score of the PVOH-protected sample was 0.02; the average Taber score of an unprotected control sample subjected to the same abrasion test was 3.01 (see Table 1 below).

EXAMPLE 3

Twenty-five (25) ml of Spraylat® "A" polymer aqueous dispersion (commercially available from Spraylat Corporation) was mixed in an equal volume of deionized (DI) water at ambient room temperature; this is referred to as "50% concentrated Spraylat A dispersion". Using a polyethylene pipette, a quantity of the 50% concentrated Spraylat A dispersion was applied as a small puddle to a 4 inch×4 inch (10 cm×10 cm) coupon of glass coated with the same functional coating as in Example 1. This puddle was then more uniformly distributed over the surface of the sample using a stainless steel drawdown bar at 0.005 inch (5 "mils" or 0.013 cm) wet film thickness. The sample was allowed to dry under a 250 W heat lamp for about five minutes. After drying, the sample was weighed; the uncoated weight of the sample was subtracted from the coated weight and the mass of the polymer coating on the sample was determined to be 0.3061 g, which provides an expected average mass per square foot of 2.8 g/ft$^2$ (31 g/m$^2$). The 50% concentrated Spraylat A-coated glass sample was then subjected to the Taber abrasion test (as described above) for 100 cycles. After the Taber test, the Spraylat A coating was removed by peeling it off by hand. This was easily done and appeared to cause no negative effect on the underlying MSVD coating. Inspection of the sample after peeling off the Spraylat A coating showed that no Taber abrasion track was visible; the average Taber score for this sample was 0.00. A control sample of functionally coated glass without a protective coating of the invention showed extensive damage to the MSVD coating; the corresponding average Taber score for the control sample was 2.96.

EXAMPLE 4

Fifty (50) ml of Michem® Prime 4983R-HS ethylene/acrylic acid (EAA) copolymer dispersion (commercially available from Michelman, Inc.) was mixed with an equal volume of deionized water; the resulting dispersion is referred to as being "50% concentrated". Approximately 0.5 ml of 1 N ammonium hydroxide (NH$_4$OH) was added to stabilize the dispersion after dilution. In addition, approximately 1 ml of Dynol® 604 surfactant (commercially available from Air products and Chemicals, Inc.) was added to improve the wetting behavior of the dispersion. The 50% concentrated dispersion (with NH$_4$OH and Dynol® 604 additives) was applied as a small puddle to a 4 inch×4 inch (10 cm×10 cm) coupon of glass coated with the same functional coating as in Example 1. This puddle was then more uniformly distributed over the surface of the sample as described in Example 1, dried under a heat lamp, and then weighed. The mass of the polymer coating on the 10 cm×10 cm sample was determined to be 0.1529 g, providing an expected average mass of 1.4 g/ft$^2$ (15.6 g/m$^2$). The EAA copolymer-coated glass sample was then subjected to the Taber abrasion test (as described above) for 100 cycles. After the Taber test, the polymer coating was removed by soaking the coated glass sample in an NH$_4$OH solution (pH 11) for about three minutes and wiping with a Kaydry® wipe (commercially available from Kimberly-Clark Corporation) followed by a rinse under running cold deionized water. After rinsing, the sample was blown dry with compressed air. In comparison with control samples (i.e., functionally coated substrates without the protective coating) subjected to the same Taber test, there was significantly less abrasion visible on the EAA copolymer-coated sample. The degree of scratching was determined by measuring the diffuse reflectance from four compass-point locations around the circular Taber abrasion track using a Spectrogard calorimeter in "specular-excluded" mode. The EAA copolymer-coated sample had an average Taber score of 0.02. An unprotected control sample subjected to the same 100 cycle Taber abrasion test had an average Taber score of 2.78.

EXAMPLE 5

A 10 cm×10 cm sample of glass having the same functional coating as in Example 1 was coated with a 6 weight percent aqueous solution of polyethylene oxide (PEO) and dried in an oven at a temperature of about 260° F. (121° C.) for about 5 to 15 minutes. On a similarly prepared sample, the resulting dried polymer coating was estimated to be about 7 μm in thickness and to corresponded to an estimated mass coverage (dry coating mass) of about 0.7 g/ft$^2$ (7.8 g/m$^2$) assuming a uniform coating with an average mass density of about 1 g/cm$^3$. The PEO-coated glass sample was then subjected to the Taber abrasion test (as described above) for 100 cycles. Since polyethylene oxide is a water-soluble polymer, it would have been possible to remove the polymer coating from the substrate by exposing it to water (as done for polyvinyl alcohol-coated samples above), the PEO coating had sufficient mechanical integrity that it could also be removed by mechanical peeling. The PEO-coating was peeled off the glass substrate and the substrate was rinsed in deionized water. After rinsing, the sample was blown dry with compressed air. In comparison with a control sample subjected to the same Taber test, there was significantly less abrasion visible on the PEO-coated sample. The degree of scratch ing was determined as described above. The PEO-coated sample had an average Taber score of 0.01. An unprotected control sample subjected to the same 100 cycle Taber abrasion test had an average Taber score of 2.98.

EXAMPLE 6

A sample (10 cm×10 cm) of glass having the same functional coating as in Example 1 was coated with a 10 weight percent aqueous solution of polyethylene oxide (PEO) with dispersed aluminum oxide (Al$_2$O$_3$) nanoparticles and dried in an oven as described in Example 5; the weight ratio of PEO to aluminum oxide in solution was 46%/54%. On a similarly prepared sample, the resulting dried polymer coating was estimated to be about 10 μm in thickness and corresponded to an estimated mass coverage (dry coating mass) of about 2.4 g/ft$^2$ (26.7 g/m2) assuming a uniform film having estimated average mass density of about 2.6 g/cm$^3$. This estimate was calculated by assuming an average mass density of about 3.95 g/cm$^3$ for aluminum oxide (alpha phase), an average mass density of about 1 g/cm$^3$ for PEO, and weighting the assumed densities by their weight fractions in the dried coating. The PEO/Al$_2$O$_3$-coated glass sample was then subjected to the Taber abrasion test (as described above) for 100 cycles. The PEO polymer matrix of the protective coating is a water-soluble material; this renders it possible to remove the protective coating by washing/rinsing with water. After removal of the PEO/Al$_2$O$_3$ coating by rinsing with water, the sample was blown dry with compressed air. In comparison with a control sample subjected to the same Taber test, there was significantly less abrasion visible on the PEO/Al$_2$O$_3$-coated sample. The degree of scratching was determined as described above. The PEO/Al$_2$O$_3$-coated sample had an average specular excluded Taber score of 0.00. An unprotected control sample subjected to the same 100 cycle Taber abrasion test had an average Taber score of 2.98.

EXAMPLE 7

Using a polyethylene pipette, a quantity of Chempeel™ WB polymer dispersion (commercially available from PPG Industries, Inc.) was applied as a small puddle to a 4 inch×4 inch (10 cm×10 cm) coupon of glass having the same functional coating of Example 1. This puddle was then more uniformly distributed over the surface of the sample using a stainless steel drawdown bar at 0.005 inch (0.013 cm) wet film thickness. The sample was allowed to dry under a 250 W heat lamp for about 5 minutes. After drying, the sample was weighed; the uncoated weight of the sample was subtracted from the coated weight and the mass of the polymer coating on the sample was determined to be 0.5314 g. From this result, the expected average mass per square foot was estimated to be about 4.8 g/ft$^2$ (53.3 g/m$^2$). The Chempeel WB-coated glass sample was then subjected to the Taber abrasion test (as described above) for 100 cycles. After the Taber test, the Chempeel WB coating was removed by manually peeling it off the sample. In comparison with control samples subjected to the same Taber test, there was no Taber abrasion track visible on the Chempeel WB-protected samples. The degree of scratching was determined by measuring the diffuse reflectance around a circle where the Taber abrasion track would normally be expected to be present. The Chempeel WB-protected samples had an average Taber score of 0.00, whereas an unprotected control sample had an average Taber score of 2.91.

EXAMPLE 8

Fifty (50) ml of Rhoplex® WL-96 polymer emulsion (commercially available from Rohm and Haas Company) was mixed with an equal volume of deionized water; the resulting emulsion is referred to as being "50% concentrated". Approximately 1 ml of Dynol® 604 surfactant (commercially available from Air Products and Chemicals, Inc.) was added to improve the wetting behavior of the emulsion. The 50% concentrated emulsion was applied as a small puddle to a 4 inch×4 inch (10 cm×10 cm) coupon of glass having the same functional coating as Example 1. This puddle was then more uniformly distributed over the surface of the sample using a stainless steel drawdown bar at 0.005 inch (0.013 cm) wet film thickness. The sample was dried under a 250 W heat lamp for about five minutes. After drying, the sample was weighed; the uncoated weight of the sample was subtracted from the its coated weight and the mass of the polymer coating was determined to be 0.2137 g. From this result, the mass of the coating was estimated to be about 1.9 g/ft$^2$ (21 g/m$^2$). The polymer-coated glass sample was then subjected to the Taber abrasion test (as described above) for 100 cycles. After the Taber test, the polymer coating was removed by soaking the coated glass sample in a NH$_4$OH solution (pH 11) for about five minutes and wiping the dissolved polymer coating off the substrate followed by a rinse under running cold deionized water. After rinsing, the sample was blown dry with compressed air. In comparison with control samples subjected to the same Taber test, there was significantly less abrasion visible on the Rhoplex WL-96 polymer-coated sample. The degree of scratching was determined as described in Example B. The Rhoplex WL-96 polymer-coated sample had an average Taber score of 0.00. An unprotected control sample subjected to the same 100 cycle Taber abrasion test had an average Taber score of 3.02.

EXAMPLE 9

A quantity of Transeal™ polymer dispersion (commercially available from PPG Industries, Inc.) was applied as a small puddle to a 4 inch×4 inch (10 cm×10 cm) coupon of glass having the same functional coating as in Example 1. This puddle was then more uniformly distributed over the surface of the sample using a stainless steel drawdown bar at 0.005 inch (0.013 cm) wet film thickness. The sample was dried under a 250 W heat lamp for about five minutes. After drying, the sample was weighed; the uncoated weight of the sample was subtracted from its coated weight and the mass of the polymer coating was determined to be 0.4455 g. From this result, the mass per square foot was estimated to be about 4 g/ft$^2$ (44.4 g/m$^2$). The polymer-coated glass sample was then subjected to the Taber abrasion test (as described above) for 100 cycles. After the Taber test, the polymer coating was removed manually by peeling it off the substrate. This peeling operation left behind some residues on the MSVD coated surface; the residues were removed by wiping the sample with a 50 vol. % mixture of isopropynol and deionized water. After cleaning, the sample was blown dry with compressed air. In comparison with control samples subjected to the same Taber test, there was no Taber abrasion track visible on the Transeal polymer-coated sample. The degree of scratching was determined as described above. The Transeal polymer-coated sample had an average Taber score of 0.13. An unprotected control sample subjected to the same 100 cycle Taber abrasion test had an average Taber score of 2.57.

EXAMPLE 10

An amount (285 ml) of deionized (DI) water was heated to 90° C. An amount (15.0634 g) of Methocel® K100LV hydroxypropyl methylcellulose (commercially available from Dow Chemical Company) was added to the hot water and stirred until the powder was dissolved. Heating and stirring of the solution was maintained for about 30 minutes. Heat was then removed from the solution whilst stirring continued to allow the solution to cool for about 60 to about 120 minutes. This procedure resulted in a 5 wt. % hydroxypropyl methylcellulose in DI water solution. Using a polyethylene pipette, a quantity of the solution was applied as a small puddle to a 4 inch×4 inch (10 cm×10 cm) coupon of glass having the same functional coating as in Example 1. This puddle was then more uniformly distributed over the surface of the sample using a stainless steel drawdown bar at 0.015 inch (0.013 cm) wet film thickness. The sample was dried under a 250 W heat lamp for about 5 minutes. After drying, the sample was weighed; the uncoated weight of the sample was subtracted from the coated weight and the mass of the polymer coating was determined to be 0.2462 g. From this result, the expected average mass per square foot was estimated to be about 2.2 g/ft$^2$ (24.4 g/m$^2$). The polymer-coated glass sample was then subjected to the Taber abrasion test (as described above) for 100 cycles. After the Taber test, the hydroxypropyl methylcellulose coating was removed by rinsing under cold running DI water. After rinsing, the sample was blown dry with compressed air. In comparison with a control sample subjected to the same Taber test, there was significantly less abrasion visible on the polymer-protected sample. The degree of scratching was determined as described above. The average Taber score of the hydroxypropyl methylcellulose-protected sample was 0.02; the average Taber score of an unprotected control sample subjected to the same abrasion test was 2.80 (see Table 1 below).

TABLE 1

EXAMPLES OF TEMPORARY (REMOVABLE) PROTECTIVE POLYMERIC COATINGS FOR MSVD COATED GLASS SUBSTRATES.

| Sample ID | Protective coating material name | Concentration (wt. % or concentration factor) | Mass of dried polymer coating on 4" × 4" glass sample (g) | Average specular excluded Taber score after removal of polymer coating |
|---|---|---|---|---|
| Example 1 | Airvol 103 polyvinyl alcohol | 5 wt. % | 0.0714 | 0.10 |
|  | None (control) | N/A | N/A | 2.65 |
| Example 2 | Airvol 203 polyvinyl alcohol | 5 wt. % | 0.1991 | 0.02 |
|  | None (control) | N/A | N/A | 3.01 |
| Example 3 | SprayLat A (proprietary formulation) | 50% concentration by volume | 0.3061 | 0.00 |
|  | None (control) | N/A | N/A | 2.96 |
| Example 4 | Michem Prime 4983R-HS (proprietary formulation) | 50% concentration by volume | 0.1529 | 0.02 |
|  | None (control) | N/A | N/A | 2.78 |
| Example 5 | Polyethylene oxide (PEO) | 6 wt. % | Approximate thickness = 7 $\mu$m) estimate 0.07–0.08 g | 0.01 |
|  | None (control) | N/A | N/A | 2.98 |
| Example 6 | PEO/Al$_2$O$_3$ | 10 wt. % | Approximate thickness = 10 $\mu$m); estimate 0.3 g | 0.00 |
|  | None (control) | N/A | N/A | 2.98 |
| Example 7 | Chempeel WB (proprietary formulation) | 100% concentration | 0.5314 | 0.00 |
|  | None (control) | N/A | N/A | 2.91 |
| Example 8 | Rhoplex WL-96 (proprietary formulation) | 50% concentration by volume | 0.2137 | 0.00 |
|  | None (control) | N/A | N/A | 3.02 |
| Example 9 | Transeal (proprietary formulation) | 100% concentration | 0.4455 | 0.13 |
|  | None (control) | N/A | N/A | 2.57 |
| Example 10 | Methocel KL00LV Hydroxypropyl methylcellulose | 15 wt % | 0.2462 | 0.02 |
|  | None (control) | N/A | N/A | 2.90 |

EXAMPLE 11

The test substrates used in Example 11 had a different functional coating than the substrates used in Examples 1–10. The functional coating used for Example 11 was a silver based, multi-layer, solar control, MSVD deposited coating.

A 12 weight percent solution of Airvol® 203 polyvinyl alcohol in distilled water was prepared substantially as described above in Example 1. Additionally, BYK-306 polyether modified polydimethyl polysiloxane surfactant (commercially available from BYK-Chemie) was also added to a level of about 0.55 weight percent of the coating solution. The coating composition or solution was spray applied using an air-atomized spray device onto two 24 inch×36 inch (61 cm×91 cm), 3.2 mm thick, glass substrates having a silver based, multi-layer, solar control, MSVD deposited coating and using the following spray-coating parameters.

The coating solution was spray applied at a flow rate of 37.0 ml/min., a liquid pressure of 15 psig (1 kg/sq. cm), an atomizing pressure of 85 psig (6 kg/sq. cm), and a fan pressure of 10 psig (0.7 kg/sq. cm) with the spray nozzle approximately 10 inches (25 cm) from the substrate. The coated substrates were dried for about 30 seconds under turbulent air flow and then a one square foot (0.09 m$^2$) section of each of the dried substrates was cut into nine 4 inch by 4 inch (10 cm×10 cm) square samples. The mass coverage on each sample was determined by subtracting the uncoated weight of the sample from the coated weight. As shown in Table 2 below, the average mass coverage was 0.1639 grams for the coated samples. Taber tests (as described above) were then conducted at 10, 25, 50, 75 and 100 cycles for pairs of samples from each substrate. After the Taber tests, the PVOH coating was removed by rinsing under cold running DI water and blown dry with compressed air. In comparison with control samples (i.e., functionally coated samples without the protective coating of the invention), there was significantly less abrasion visible on the PVOH coated samples. The degree of scratching was determined as described above. The average mass coverage (g/ft$^2$ or g/m$^2$ either actual or estimated) and Taber score for the samples and the control are shown in Table 2.

In the Sample designations of Table 2, the prefix "1" means a sample that was cut out of the first 24"×36" (61 cm×91 cm) substrate sprayed. The prefix "2" means the sample was cut out of the second 24"×36" (61 cm×91 c cm) substrate plate sprayed. The numbers 10, 25, 50, 75, 100 refer to the number of Taber cycles used to abrade a given sample and "A" and "B" designate 4"×4" (10 cm×10 cm) samples cut from two different locations on each 24"×36" (61 cm×91 cm) substrate.

TABLE 2

| Sample | Approx. g/sq. ft. (g/m$^2$) | Taber Cycles (dimensionless) | Average specular-excluded Taber Score (dimensionless) |
| --- | --- | --- | --- |
| 1-10A | 0.2007 (2.2) | 10 | 0.09 |
| 1-10B | 0.0684 (0.76) | 10 | 0.06 |
| 1-25A | 0.1413 (1.6) | 25 | 0.34 |
| 1-25B | 0.1818 (2.0) | 25 | 0.22 |
| 1-50A | 0.2061 (2.3) | 50 | 0.92 |
| 1-50B | 0.1908 (2.1) | 50 | 0.66 |
| 1-75A | 0.1746 (1.9) | 75 | 1.75 |
| 1-75B | 0.1710 (1.9) | 75 | 1.72 |
| 1-100A | 0.1674 (1.86) | 100 | 2.07 |
| 1-100B | 0.1944 (2.16) | 100 | 1.88 |
| 2-10A | 0.1539 (1.71) | 10 | 0.17 |
| 2-10B | 0.1926 (2.14) | 10 | 0.05 |
| 2-25A | 0.0954 (1.06) | 25 | 0.67 |
| 2-25B | 0.1755 (1.95) | 25 | 0.31 |
| 2-50A | 0.1233 (1.37) | 50 | 0.90 |
| 2-50B | 0.1800 (2.0) | 50 | 1.08 |
| 2-75A | 0.1863 (2.07) | 75 | 1.39 |
| 2-75B | 0.2277 (2.53) | 75 | 1.14 |
| 2-100A | 0.1377 (1.53) | 100 | 2.11 |
| 2-100B | 0.1089 (1.21) | 100 | 1.91 |
| average | 0.1639 (1.82) | | |
| Control-0 | N/A | 0 | 0.00 |
| Control-10 | N/A | 10 | 0.72 |
| Control-25 | N/A | 25 | 1.29 |
| Control-50 | N/A | 50 | 1.84 |
| Control-75 | N/A | 75 | 2.21 |
| Control-100 | N/A | 100 | 2.32 |

The functional coating utilized in the above testing was an MSVD applied coating. In order to determine the effect of coating type on abrasion resistance, samples of glass having a pyrolytically applied (APCVD) low emissivity coating were subjected to Taber testing at 10, 25, 50, 75 and 100 cycles as described above. The degree of scratching was determined by measuring specular-excluded diffuse reflectance as described above. The results of the testing are shown in Table 3 below.

TABLE 3

| Sample | Taber Cycles (dimensionless) | Average specular-excluded Taber Score (dimensionless) |
| --- | --- | --- |
| S5-Control | 0 | 0.01 |
| S5-10 | 10 | 0.09 |
| S5-25 | 25 | 0.15 |
| S5-50 | 50 | 0.33 |
| S5-75 | 75 | 0.45 |
| S5-100 | 100 | 0.61 |

Figure 3:
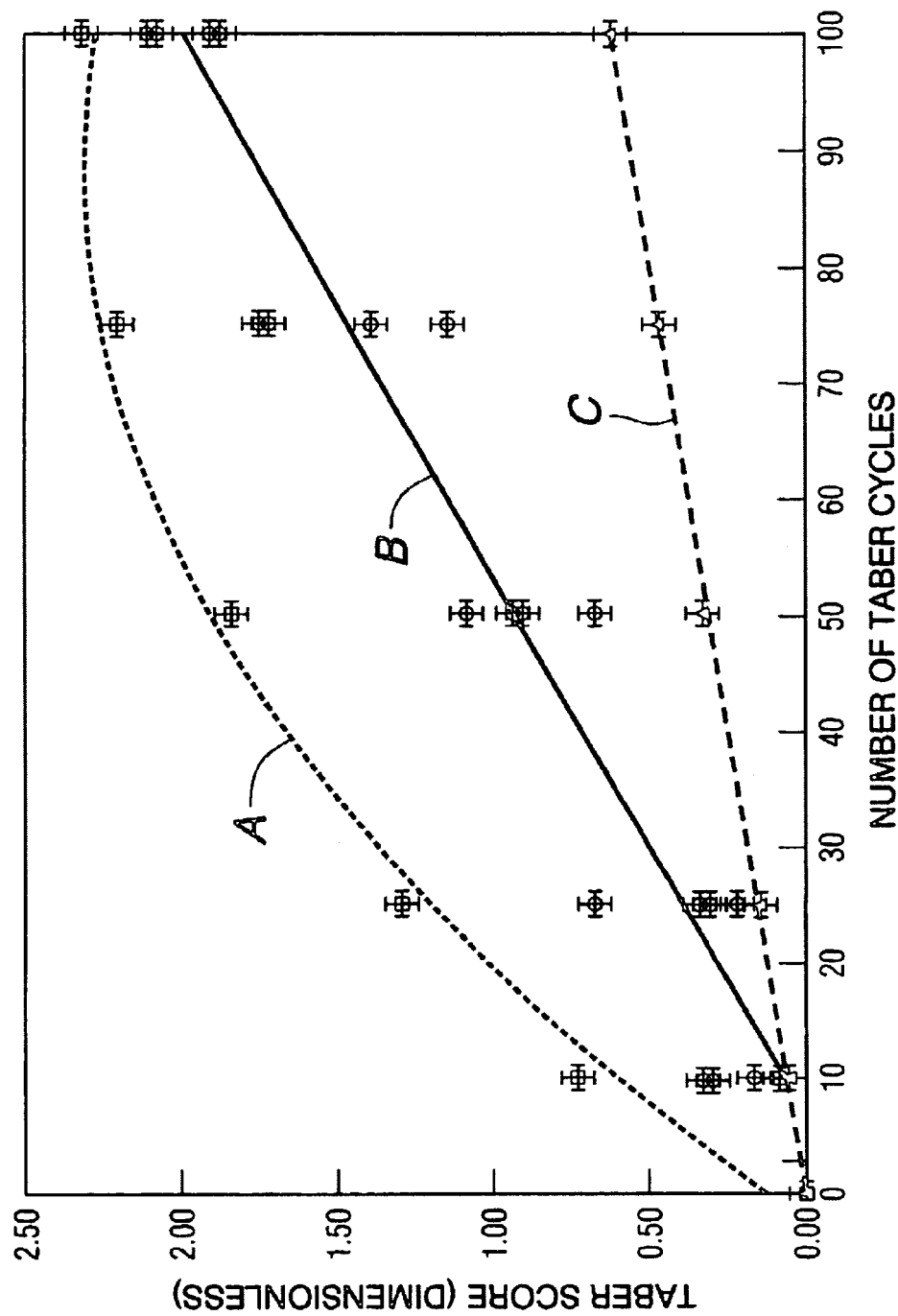
FIG. 3 is a graph of Taber score versus number of Taber cycles for selected coated glass substrates discussed in Example 11.

A graph of the Taber Score versus the number of Taber cycles for the MSVD applied functionally coated substrates of Table 2 tested with the protective coating of the invention (○) and without the protective coating (□), and for the pyrolytically applied functionally coated substrates of Table 3 without a protective coating of the invention (▲) are graphically shown in FIG. 3. Best fit curves A–C shown in FIG. 3 for these data were calculated to be (A):y=−0.0003x$^2$+0.0497x+0.1294 for the MSVD coated substrates tested without a protective coating; (B):y=0.0214x−0.1437 for the MSVD coated substrates tested with a protective coating; and (C):y=0.0059x+0.0162 for the pyrolytically coated substrates tested without a protective coating.

As shown in FIG. 3, the MSVD coated substrates with the protective coating of the invention compare favorably with the substrates having the pyrolytically applied coating but no protective coating at lower Taber cycles of 10 and 25 but then begin to deviate as the number of Taber cycles increase. While increasing the thickness, e.g., mass coverage, of the protective layer of the invention would no doubt improve abrasion resistance, the thickness of the protective coating should be balanced against the processing requirements for the protective coating covered article. For example, thicker protective coatings may make conventional scoring of the glass more problematic or could be more difficult to remove quickly and cleanly.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A coated article, comprising:
   a substrate having a first surface;
   a functional coating deposited over at least a portion of the first surface, wherein the functional coating, is selected from the group consisting of single layer and multiple layer coatings; and
   a removable protective coating deposited over at least a portion of the functional coating, where the protective coating is removable by washing with an appropriate solvent or by combustion or by thermal decomposition, wherein the removable protective coating is essentially free of spacer material and consists essentially of polyvinyl alcohol having a degree of hydrolyzation greater than 80 percent, and the substrate is at approximately room temperature when the removable protective coating is deposited.

2. The article according to claim 1, wherein the substrate has at least one light transmitting surface.

3. The article according to claim 1, wherein the substrate is selected from the group consisting of glass, polymers, polyester polycarbonates, polyethyleneterephthalate, plastic, ceramic, metal, cellulose, and mixtures or combinations thereof.

4. The article according to claim 1, wherein the substrate is selected from the group consisting of flat glass, untempered glass, tempered glass, and heat-strengthened glass.

5. The article according to claim 1, wherein the substrate is glass and has dimensions larger than about 1.8 m by about 2.1 m.

6. The article according to claim 1, wherein the substrate has dimensions smaller than about 1.8 m by about 2.1 m.

7. The article according to claim 1, wherein the functional coating is selected from the group consisting of pyrolytically deposited coatings, sputter deposited coatings, wet chemistry deposited coatings, and chemical vapor deposition deposited coatings.

8. The article according to claim 1, wherein the, functional coating is selected from the group consisting of low emissivity coatings, solar energy reflective or absorptive coatings, and thermal infrared reflective or absorptive coatings and combinations thereof.

9. The article according to claim 1, wherein the removable coating is a substantially continuous coating.

10. The article according to claim 1, wherein the removable coating is a substantially non-continuous coating.

11. The article according to claim 1, wherein the coating composition comprises one or more non-aqueous carriers.

12. The article according to claim 11, wherein the removable protective coating includes a substantially aqueous carrier and is water-soluble.

13. The article according to claim 11, wherein the removable protective coating further includes at least one additive selected from the group consisting of fillers, biocides, surfactants, defoamers, colorants, flow agents, leveling agents, hydrophilic agents, hydrophobic agents, spacer materials and fragrance materials.

14. The article according to claim 11, wherein the non-aqueous carrier comprises at least one of isopropanol, methanol, or ethanol.

15. A coated article, comprising:
a substrate having a first surface;
a functional coating deposited over at least a portion of the first surface wherein the functional coating, is selected from single or multiple layer coating comprising one or more metals, non-metals, semi-metals, semiconductors, or alloys compounds, composites, combinations and blends thereof, and has properties selected from the group of solar control properties, optical properties, thermal properties and combinations thereof, and
a removable protective coating deposited over at least a portion of the functional coating to protect the underlying functional coating, where the protective coating is removable by washing with water or by combustion or by thermal decomposition, wherein the removable protective coating is essentially free of spacer material when the functional coating is a single layer metal oxide, the removable protective coating consists essentially of polyvinyl alcohol having a degree of hydrolyzation greater than 80 percent, and the substrate is at approximately room temperature when the removable protective coating is deposited.

16. The article according to claim 15, wherein the removable coating has a mass coverage of greater than 0 to about 1 gram per square foot.

17. The article according to claim 15, wherein the removable coating has a mass coverage of about 0.1 to about 0.2 gram per square foot.

18. A coated article, comprising:
a flat glass substrate having a first surface;
a functional coating deposited over at least a portion of the first surface; and
a removable protective coating deposited over at least a portion of the functional coating, wherein the protective coating is essentially free of spacer material and consists essentially of polyvinyl alcohol having a degree of hydrolyzation greater than 80 percent, and the substrate is at approximately room temperature when the removable protective coating is deposited.

19. The article according to claim 18, wherein the functional coating is selected from the group of single layer and multiple layer coatings, wherein the functional coating comprises one or more metals, non-metals, semi-metals, semiconductors, or alloys, compounds, composites, combinations, and blends thereof.

20. The article according to claim 18, wherein the removable protective coating is peelable.

21. A coated article, comprising:
a glass substrate having a first surface;
a functional coating deposited over at least a portion of the first surface; and
a removable protective coating deposited over at least a portion of the functional coating to protect the underlying functional coating, wherein the protective coating has a thickness of less than about 50 microns, the removable protective coating consist essentially of polyvinyl alcohol having a degree of hydrolyzation greater than 80 percent, and the substrate is at approximately room temperature when the removable protective coating is deposited.

22. The article according to claim 21, wherein the functional coating is selected from the group of single layer and multiple layer coatings, wherein the functional coating comprises one or more metals, non-metals, semi-metals, semiconductors, or alloys, compounds, composites, combinations, and blends thereof, and wherein the removable protective coating is essentially free of spacer material when the functional coating is a single layer metal oxide.

23. The article according to claim 21, wherein the removable protective coating is peelable.

24. The article according to claim 21 wherein (a) the glass substrate is a flat glass substrate; (b) the functional coating has solar control properties, optical properties, thermal properties and combinations thereof and is selected from the group of single layer and multiple layer coatings, and (c) the removable protective coating is water soluble and is on the functional coating.

25. A coated article, comprising:
a substrate having a first surface;
a functional coating deposited over at least a portion of the first surface, wherein the functional coating is selected from the group consisting of single layer and multiple layer coatings, and
a removable protective coating deposited over at least a portion of the functional coating, where the protective coating is removable by washing with an appropriate solvent or by combustion or by thermal decomposition, wherein the removable protective coating is essentially free of spacer material when the functional coating is a single layer metal oxide, the removable protective coating consists essentially of polyvinyl alcohol having a degree of hydrolyzation greater than 80 percent, and the substrate is at approximately room temperature when the removable protective coating is deposited.

* * * * *